United States Patent
Jarrahi Khameneh et al.

(10) Patent No.: US 9,565,687 B2
(45) Date of Patent: Feb. 7, 2017

(54) TRANSMISSION OF QUALITY METRICS IN A WIRELESS COMMUNICATION DEVICE

(71) Applicant: QUALCOMM Incorporated, San Diego, CA (US)

(72) Inventors: Ali Jarrahi Khameneh, San Diego, CA (US); Kandarpkumar Patel, San Diego, CA (US); Chintan Shirish Shah, San Diego, CA (US); Shahabuddin Mohammad, San Diego, CA (US); Praveen Kumar Appani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/807,966

(22) Filed: Jul. 24, 2015

(65) Prior Publication Data

US 2016/0278106 A1 Sep. 22, 2016

Related U.S. Application Data

(60) Provisional application No. 62/135,260, filed on Mar. 19, 2015.

(51) Int. Cl.
*H04W 72/00* (2009.01)
*H04W 72/08* (2009.01)
(Continued)

(52) U.S. Cl.
CPC .......... *H04W 72/085* (2013.01); *H04L 1/0026* (2013.01); *H04L 1/0027* (2013.01);
(Continued)

(58) Field of Classification Search
CPC ...... H04W 36/20; H04W 88/06; H04W 36/24; H04W 36/14; H04W 72/1215; H04W 72/085; H04W 16/14; H04W 72/082; H04W 24/10; H04L 1/0026; H04L 1/0027; H04L 5/0023
(Continued)

(56) References Cited

U.S. PATENT DOCUMENTS

| 6,023,459 A | * | 2/2000 | Clark | .................... H04W 16/18 370/329 |
| 7,306,312 B2 | * | 12/2007 | Chiwata | .................. B41J 2/205 347/15 |

(Continued)

FOREIGN PATENT DOCUMENTS

WO 2012061765 A1 5/2012

OTHER PUBLICATIONS

International Search Report and Written Opinion—PCT/US2016/015116 ISA/EPO—May 2, 2016.

*Primary Examiner* — Mahendra Patel
(74) *Attorney, Agent, or Firm* — The Marbury Law Group, PLLC

(57) ABSTRACT

Various embodiments include methods for reporting quality metrics of a wireless communication device to a network that includes scheduling, on the wireless communication device, a tune-away from a first carrier of a first subscription to a second subscription. Quality metrics of the first carrier before the tune-away begins are calculated and stored as frozen quality metrics. During the tune-away, the wireless communication device sends the stored frozen quality metrics to the network. The stored frozen quality metrics may continue to be sent to the network as long as the duration of the tune-away is shorter than a time threshold. If the duration of the tune-away exceeds the time threshold, the wireless communication device may calculate and send actual quality metrics of the carrier to the network.

28 Claims, 9 Drawing Sheets

(51) Int. Cl.
*H04L 1/00* (2006.01)
*H04W 88/06* (2009.01)
*H04L 5/00* (2006.01)

(52) U.S. Cl.
CPC ............ *H04L 5/006* (2013.01); *H04L 5/0023* (2013.01); *H04W 88/06* (2013.01)

(58) Field of Classification Search
USPC .......................................... 455/452.2, 456.5
See application file for complete search history.

(56) References Cited

U.S. PATENT DOCUMENTS

| | | | | |
|---|---|---|---|---|
| 7,356,017 | B2* | 4/2008 | Codreanu | H04L 5/0046 370/329 |
| 7,561,882 | B2* | 7/2009 | Kasapi | H04W 28/18 455/450 |
| 7,916,081 | B2* | 3/2011 | Lakkis | H04B 7/0417 342/367 |
| 8,498,193 | B2* | 7/2013 | Haardt | H04B 7/0619 370/203 |
| 9,026,662 | B2* | 5/2015 | Zhu | H04L 67/303 709/226 |
| 2012/0281563 | A1* | 11/2012 | Comsa | H04W 24/10 370/252 |
| 2013/0235843 | A1 | 9/2013 | Gohari et al. | |
| 2013/0272218 | A1* | 10/2013 | Cui | H04W 72/08 370/329 |
| 2013/0303168 | A1* | 11/2013 | Aminzadeh Gohari | H04W 36/0083 455/436 |
| 2013/0303181 | A1* | 11/2013 | Rajurkar | H04W 72/0453 455/452.1 |
| 2013/0324145 | A1 | 12/2013 | Tabet et al. | |
| 2014/0086209 | A1* | 3/2014 | Su | H04W 76/026 370/331 |
| 2014/0274051 | A1* | 9/2014 | Hsu | H04W 36/20 455/436 |
| 2015/0092708 | A1 | 4/2015 | Su et al. | |

* cited by examiner

TRANSMISSION OF QUALITY METRICS IN A WIRELESS COMMUNICATION DEVICE

RELATED APPLICATIONS

This application claims the benefit of priority to U.S. Provisional Patent Application No. 62/135,260 entitled "Transmission of Quality Metrics in a Mobile Communication Device" filed Mar. 19, 2015, the entire contents of which are incorporated herein by reference.

BACKGROUND

Some designs of wireless communication devices—such as smart phones, tablet computers, and laptop computers— contain one or more Subscriber Identity Module ("SIM") cards that provide users with access to multiple separate mobile telephony networks. Examples of mobile telephony networks include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), Universal Mobile Telecommunications Systems (UMTS), evolved High Speed Packet Access (HSPA+), Dual-Cell High Speed Packet Access (DC-HSPA), Evolution Data-Optimized (EV-DO), Enhanced Data rates for GSM Evolution (EDGE), and single carrier Radio Transmission Technologies (1×RTT). A wireless communication device that includes one or more SIMs and connects to two or more separate mobile telephony networks using one or more shared radio frequency ("RF") resources/radios is termed a multi-SIM communication device. One example is a dual-SIM-dual-standby ("DSDS") communication device, which includes two SIM cards/subscriptions that are each associated with a separate radio access technology ("RAT"), and the separate RATs share one RF resource chain to communicate with two separate mobile telephony networks on behalf of their respective subscriptions. When one RAT is using the RF resource, the other RAT is in stand-by mode and is not able to communicate using the RF resource.

One consequence of having a plurality of RATs that maintain network connections simultaneously is that the RATs may sometimes interfere with each other's communications. For example, two RATs on a DSDS communication device utilize a shared RF resource to communicate with their respective mobile telephony networks, and only one RAT may use the RF resource to communicate with its mobile network at a time. Even when a RAT is in an "idle-standby" mode, meaning that the RAT is not actively communicating with the network, the RAT may still need to periodically receive access to the shared RF resource in order to perform various network operations. For example, an idle RAT may need the shared RF resource at regular intervals to perform idle-mode operations to receive network paging messages in order to remain connected to the network, etc. on behalf of the RAT's subscription.

In conventional multi-SIM communication devices, the RAT actively using an RF resource that is shared with an idle RAT may occasionally interrupt the active RAT's RF operations so that the idle RAT may use the shared RF resource to perform the idle RAT's idle-standby mode operations (e.g., paging monitoring and decoding, cell reselection, system information monitoring, etc.). This process of switching access of the shared RF resource from the active RAT to the idle RAT is sometimes referred to as a "tune-away," as the RF resource tunes away from the active RAT's frequency band or channel and tune to the idle RAT's frequency bands or channels. After the idle RAT has finished its network communications, access to the RF resource may switch from the idle RAT to the active RAT via a "tune-back" operation.

Certain advanced RATs may have additional features. For example, an LTE mobile telephony network may be able to support more than one communications channel or transmit/receive chains using only one RF resource through carrier aggregation. A multi-SIM communication device may have an RF resource that supports a primary component carrier (PCC) and one or more secondary component carriers (SCC). The PCC may include an uplink carrier channel and a downlink carrier channel on a primary cell, and each SCC may be a downlink carrier channel on secondary cells. For example, a SIM with LTE CAT6 capability may include one PCC (uplink and downlink) and two SCCs, both used for downlink communications, i.e. receive chains. During a tune-away in such a device, the RF resource may shift the secondary cells used by the SCCs of the LTE subscription to the other subscription, which may be a GSM subscription or other 3G technologies. Thus, the SCCs may not be able to receive data from the network during the tune-away.

Another advanced feature of mobile telephony networks is antenna diversity. Wireless communication devices may include multiple wireless antennas configured to receive data on a single wireless link. Antenna diversity may enhance reliability by minimizing the channel fluctuations due to fading. For example, multiple-input multiple-output (MIMO) operation may be used to receive wireless signals through multiple antennas at the same time corresponding to multiple transmitting antennas from the base station. MIMO communications takes advantage of receiving signals along multiple, different paths (multipath) that adds a spatial dimension to signal reception, which can be used in processing the received signals to increase performance. For example, in an LTE subscription with two SCCs, the SCCs may be configured for MIMO communications such that each SCC may support a separate receive chain through each antenna. In the absence of MIMO, the two SCCs may be only capable of supporting a single downlink channel because the antennas are correlated or interfere with each other.

Wireless communication devices may also include multiple wireless receive chains configured to receive data on more than one wireless link. For example, in some wireless communication systems or markets, a wireless service provider may implement more than one type of RAT or air interface protocol within a single system. Wireless communication devices that are configured with multiple receive paths may be capable of using one or more receive paths to communicate on more than one RAT at a time. Such devices, which may be referred to as a hybrid device, can therefore use a diversity antenna/receive chain to tune away to a network implemented by different carriers (e.g., using multiple SIMs), and/or the same carrier (e.g., in a hybrid system). In other wireless communication systems, wireless communication devices may be configured with multiple SIMs, each of which may be configured to communicate with different networks. Therefore, receive chain configurations may provide wireless communication devices with a variety of tune-away options, such as tuning away to a network associated with the same carrier, associated with a different carrier in the same radio access technology, associated with a different carrier in a different radio access technology, etc.

Wireless communication devices send, or report, quality metrics to the network for each communications channel. These quality metrics include a channel quality indicator (CQI) and a rank indicator (RI). These quality metrics may affect the resources that the network allocates to the channel. During tune-aways, the wireless communication device may lose certain high-speed data capabilities on certain channels and, as a consequence, report lower quality metrics for the affected channels. In response, the network may allocate lower system resources to the affected channels, such as reducing the size of resource blocks allocated to the channel or changing the modulation and coding scheme for the channel to increase redundancy. When the tune-away ends, the wireless communication device may report improved quality metrics for the affected channels, but the network may take a long time to allocate more resources to the channel. In the meantime, the lowered resources for the channel may persist and thus the channel may not operate as efficiently.

SUMMARY

Various embodiments include methods and wireless communication devices implementing methods for reporting quality metrics of a wireless communication device to a network. Various embodiments may include determining quality metrics of one or more carriers of a first subscription on the wireless communication device before a tune-away begins, storing the quality metrics on the wireless communication device, tuning away from the one or more carriers of the first subscription to a second subscription, and sending the stored quality metrics from the wireless communication device to the network during the tune-away.

In some embodiments, the method may further include determining whether the duration of the tune-away has exceeded a time threshold, continuing to send the stored quality metrics to the network during the tune-away in response to determining that the duration of the tune-away has not exceeded the time threshold, and sending actual quality metrics of the one or more carriers to the network during the tune-away in response to determining that the duration of the tune-away has exceeded the time threshold. In some embodiments, the actual quality metrics may be determined as quality metrics of the one or more carriers during the tune-away. In some embodiments, the one or more carriers may receive data from the network after the tune-away is complete at a reduced throughput relative to before the tune-away began. In some embodiments, the time threshold may be calculated as the average duration of tune-aways on the wireless communication device.

In some embodiments, the method may further include determining whether the tune-away has completed and sending actual quality metrics of the one or more carriers to the network in response to determining that the tune-away has completed. In some embodiments, the actual quality metrics may be determined as quality metrics of the one or more carriers after the tune-away is complete. In some embodiments, the stored quality metrics may include at least one of a channel quality indicator and a rank indicator. In some embodiments, the one or more carriers may be one or more secondary component carriers. In some embodiments, the first carrier may be part of an LTE subscription.

In some embodiments, determining quality metrics of the one or more carriers of the first subscription may include calculating average values of the quality metrics of the one or more carriers over a period of time before the tune-away begins. In some embodiments, determining quality metrics of the one or more carriers of the first subscription may include may include calculating instantaneous values of the quality metrics of the one or more carriers at a time instant before the tune-away begins. In some embodiments, the one or more carriers may receive data from the network after the tune-away is complete at approximately a same throughput as before the tune-away began.

Various embodiments further include a wireless communication device having a memory, a radio frequency (RF) resource, and a processor coupled to the memory and the RF resource and configured with processor executable instructions to perform operations of the methods described herein. Various embodiments include a wireless communication device having means for performing functions of the methods described herein. Various embodiments include a non-transitory processor-readable storage medium having stored thereon processor-executable instructions configured to cause a processor of a wireless communication device to perform operations of the methods described herein.

BRIEF DESCRIPTION OF THE DRAWINGS

The accompanying drawings, which are incorporated herein and constitute part of this specification, illustrate exemplary aspects of the various embodiments, and together with the general description and the detailed description given herein, serve to explain the features of the embodiments.

DETAILED DESCRIPTION

Figure 1A:
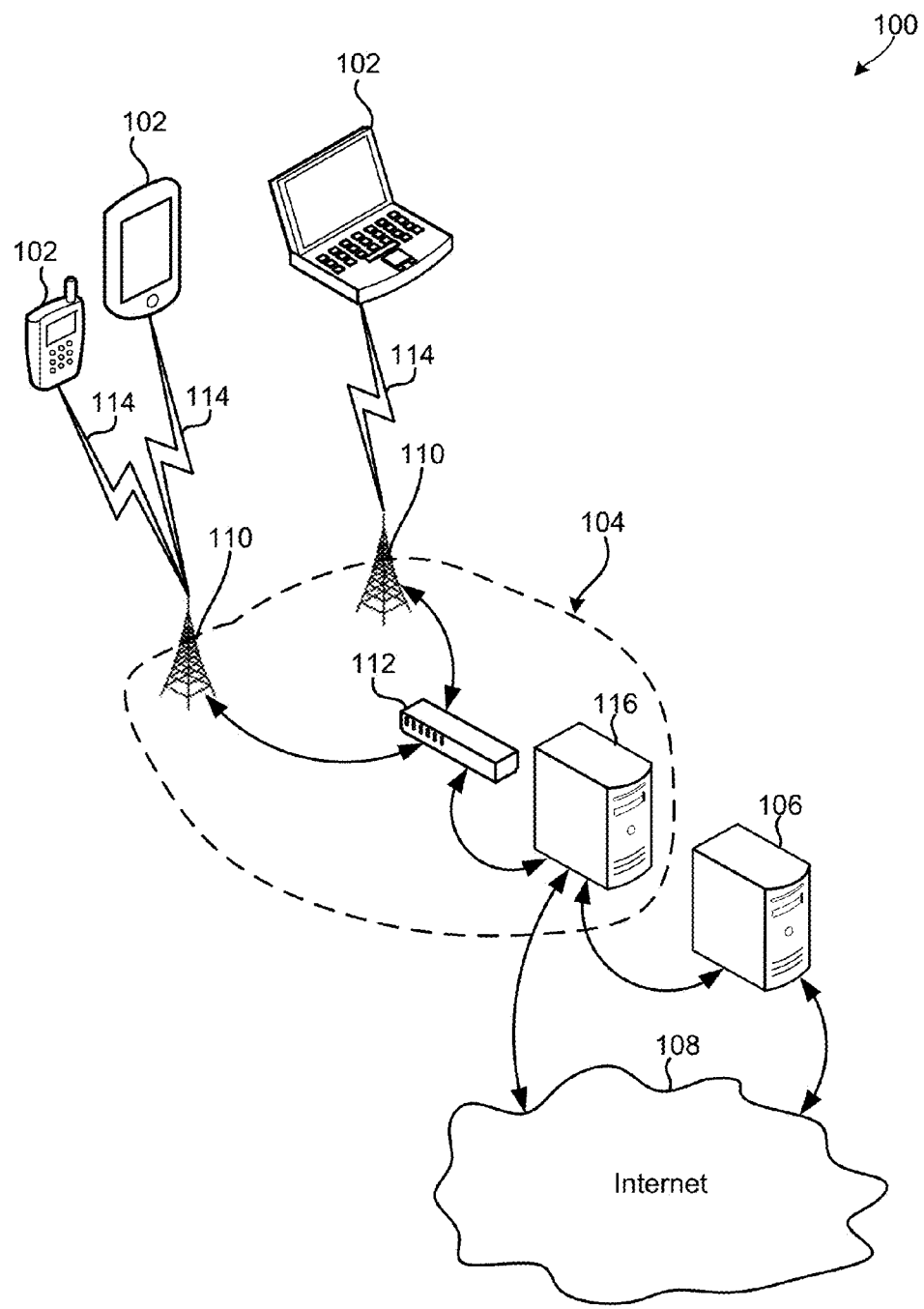
FIG. 1A is a communication system block diagram of a network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

Various embodiments include methods that enable a wireless communication device having one RF resource supporting multiple subscriptions to report quality metrics during a tune-away in a manner that reduces negative network resource impact from the tune-away. In various embodiments, the wireless communication device stores the quality metrics of a first subscription before a tune-away to a second subscription begins. The wireless communication device may calculate quality metrics (e.g., CQI, RI) of each affected carrier before the tune-away begins, such as by averaging values over time or determining the instantaneous values. These quality metrics are stored, and during the tune-away, the wireless communication device reports the stored quality metrics instead of reporting actual quality metrics of the carrier that are impacted by the tune-away. Various embodiments may prevent the network from reducing system resources allocated to the carriers in response to reported poor quality metrics.

As used herein, the terms "SIM," "SIM card," and "subscriber identification module" are used interchangeably to refer to a memory that may be an integrated circuit or embedded into a removable card, and that stores an International Mobile Subscriber Identity (IMSI), related key, and/or other information used to identify and/or authenticate a wireless communication device on a network and enable a communication service with the network. Because the information stored in a SIM enables the wireless communication device to establish a communication link for a particular communication service or services with a particular network, the term "SIM" is also be used herein as a shorthand reference to the communication service associated with and enabled by the information stored in a particular SIM as the SIM and the communication network, as well as the services and subscriptions supported by that network, correlate to one another. Similarly, the term SIM may also be used as a shorthand reference to the protocol stack and/or modem stack and communication processes used in establishing and conducting communication services with subscriptions and networks enabled by the information stored in a particular SIM.

As used herein, the terms "multi-SIM communication device" and "multi-SIM wireless communication device" are used interchangeably to describe a wireless communication device that is configured to receive more than one SIM and support multiple subscriptions associated with the multiple SIMs.

The terms "network," "wireless network," "cellular network," and "cellular wireless communication network" are used interchangeably herein to refer to a portion or all of a wireless network of a carrier associated with a wireless communication device and/or subscription on a wireless communication device.

The terms "multiple-input multiple-output" and "MIMO" are used interchangeably herein to refer to a technology that multiplies the capacity of a radio link by exploiting multi-path propagation. In particular, a wireless communication device operating in MIMO mode employs multiple radio frequency (RF) chains to receive and combine data streams arriving from different downlink paths, and/or to create multiple data streams for transmission on different uplink paths. When there are more antennas than data streams, the antennas can add receiver diversity and increase range.

As used herein, the terms "diversity," "antenna diversity," "receive diversity," "diversity reception," and "receiver diversity" are used interchangeably to refer to processing a downlink/forward link signal by input to multiple receive chains in a wireless communication device. For example, at least two antennas provide at least two different inputs signals to a receiver, each of which has a different multi-path.

Wireless communication networks are widely deployed to provide various communication services such as voice, packet data, broadcast, messaging, and so on. These wireless networks may be capable of supporting communications for multiple users by sharing the available network resources. Examples of such wireless networks include Long-Term Evolution (LTE), Global System for Mobile Communications (GSM), Code Division Multiple Access (CDMA) networks, Time Division Multiple Access (TDMA) networks, Frequency Division Multiple Access (FDMA) networks, and single carrier Radio Transmission Technologies (1×RTT). Wireless networks may also utilize various radio technologies such as Wideband-CDMA (W-CDMA), CDMA2000, Global System for Mobile Communications (GSM), etc. While reference may be made to procedures set forth in GSM standards such references are provided merely as examples, and the claims encompass other types of cellular telecommunication networks and technologies.

Modern wireless communication devices (e.g., smartphones) may each include one or more SIM cards containing SIMs that enable a user to connect to different mobile networks while using the same wireless communication device. Each SIM serves to identify and authenticate a subscriber using a particular wireless communication device, and each SIM is associated with only one subscription. For example, a SIM may be associated with a subscription to one of LTE, GSM, TD-SCDMA, CDMA2000, and WCDMA.

While specific receiver operations may be described herein with reference to a degree of two (i.e., two RF resources, two antennas, two RF chains, etc.), such references are used as example and are not meant to preclude embodiments using three or more RF resources. The terms "receiver" and/or "transmitter" may indicate an RF chain and/or portions of the RF receive chain in use for radio links. Such portions of the RF chain may include, without limitation, an RF front end, components of the RF front end (including a receiver unit and/or transmitter unit), antennas, etc. Portions of the RF chain may be integrated into a single chip, or distributed over multiple chips. Also, the RF resource, the RF chain, or portions of the RF chain may be integrated into a chip along with other functions of the wireless communication device. Further, in some embodiments, the wireless communication device may be configured with more RF chains than spatial streams, thereby enabling receive and/or transmit diversity to improve signal quality.

A wireless communication device may have one RF resource that supports multiple SIMs. For example, in a dual-SIM-dual-standby device the wireless communication device supports two SIMs that share one RF resource. One SIM may support an advanced communications network such as an LTE subscription, while the other SIM may support a legal communications network such as GSM, 1×RTT, or TD-SCDMA. The RF resource may be capable of supporting carrier aggregation and MIMO communication for the LTE subscription. That is, the LTE subscription may include a number of carriers, including a primary component carrier (PCC) and one or more secondary component carriers (SCC). The primary cell of the PCC includes a primary uplink and downlink carrier for the subscription, while the secondary cells of the SCCs may be used as additional receive chains (downlink carriers) in order to increase data throughput. The LTE subscription may support carrier aggregation and MIMO in order to implement the multi-carrier communication features of the LTE subscription.

The wireless communication device may report quality metrics to the network regarding the communications quality of each carrier, such as an SCC. These quality metrics may include a channel quality indicator (CQI) and a rank indicator (RI). The CQI may be an indication of the quality of the communications channel. The CQI may be based on a number of factors, including bit error rate, received signal strength, and signal to noise ratio. The CQI may be quantified as a range of integers, for example 0-15 in which a lower integer indicates lower channel quality and a higher integer indicates a higher channel quality. The RI may be an indication of whether the channel is capable of MIMO communication, and the value of the RI may depend on the number of antennas on the wireless communication device. For example, in a 2×2 MIMO (two transmitters on the network and two receiver antennas on the mobile device) an RI of 2 may indicate that there is no correlation or interference between the two antennas of the RF resources and thus each antenna may support a separate downlink channel. An RI of 1 may indicate that the antennas are correlated or may interfere with each other, and so both antennas may only support a single downlink channel.

The wireless communication device computes the CQI and RI for each channel (i.e., PCC and one or more SCCs) on a periodic or non-periodic basis and reports the quality metrics to the network. The network allocates system resources based on the quality metrics reported from the wireless communication device. For example, if the quality metrics indicate poor channel quality, the network may allocate lower system resources to the channel, such as reducing the size of resource blocks allocated to the channel or changing the modulation and coding scheme (MCS) for the channel to increase redundancy. If the quality metrics indicate high channel quality, the network may increase the resource block size or change the MCS to reduce redundancy.

In wireless communication devices with multiple subscriptions sharing one RF resource, the RF resource may tune-away from an active subscription to the idle subscription so that the idle subscription can perform idle mode operations. For example, a wireless communication device with an active LTE subscription engaged may periodically tune away to an idle GSM subscription. During a tune-away, the secondary cells used by the SCCs of the LTE subscription may be given to the GSM subscription to conduct the tune-away. The primary cell of the LTE subscription may still be active during the tune-away. When the wireless communication device calculates the quality metrics for the SCCs during the tune-away, the metrics are low because the SCCs cannot communicate with the network. For example, during a tune-away, the CQI of an SCC may be zero and the RI may be one. These quality metrics are reported to the network, which responds by reducing the system resources allocated to the SCC channel. When the tune-away is complete, the quality metrics of the SCC may increase. For example, the CQI of the SCC may increase from zero to fifteen, and the RI may increase from one to two. The wireless communication device reports the new quality metrics to the network. However, there may be delay between when the base station of the LTE network (i.e., eNodeBs) may process the change in quality metrics and change the resources allocated to the channel. Thus in the interim, the SCC channel may be operating at less than full capacity.

Systems, methods, and devices of various embodiments enable a wireless communication device having one RF resource supporting multiple subscriptions to report quality metrics during a tune-away in such a way as to reduce negative network resource impacts of performing the tune-away. When a tune-away from a first subscription to a second subscription is scheduled, the wireless communication device may store the quality metrics of the first subscription before the tune-away begins. For example, the first subscription may have a number of carriers (e.g., SCCs) that are affected during the tune-away. The wireless communication device may calculate the quality metrics (e.g., CQI, RI) of each affected carrier before each tune-away begins. The calculated quality metrics may be averages of values measured over a period of time before the tune-away begins, or may be instantaneous values measured shortly before the tune-away begins. These stored quality metrics maybe stored in memory, and thus may be referred to herein as "stored quality metrics" or "frozen quality metrics."

During the tune-away, the wireless communication device may report the frozen quality metrics instead of reporting the actual quality metrics of the carrier (which would be low). This may prevent the network from reducing system resources allocated to the carriers in response to poor quality metrics. By continuing to receive quality metrics based on measurements before the tune-away, the network may operate as if the carriers had the same operational capacity as before the tune-away began. Once the tune-away is complete the wireless communication device may resume reporting the actual quality metrics to the network. In this manner, the carriers affected by the tune-away may continue operating at full capacity immediately after the tune-away is complete, rather than wait for the network to receive updated quality metrics and increase the system resources allocated to the carrier.

The amount of time that the wireless communication device may report frozen quality metrics to the network may be limited by a time threshold. For example, while the duration of the tune-away is less than the time threshold, the wireless communication device may report the frozen quality metrics to the network. However, if the duration of the tune-away exceeds the time threshold, the wireless communication device may report the actual quality metrics of the carrier to the network. This may be done so that the network does not overload the carriers during a long tune-away. Reporting the actual, lower quality metrics to the network during a long tune-away may enable the network to reduce the system resources allocated to the carriers, thereby reducing the backlog of transmitted data that may accumulate.

In the following descriptions of various embodiments, references made to a first subscription and a second subscription, and corresponding first carriers and second carriers. The references to the first and second subscriptions, or first and second carriers, are arbitrary and used merely for the purposes of describing the embodiments. The wireless communication device processor may assign any indicator, name or other designation to differentiate the subscriptions associated with one or more SIMs, and to differentiate the carriers used by a subscription. Further, methods according to various embodiments apply the same regardless of which carrier channel, or receive chain, is being used to tune away from the high-speed (e.g., LTE) network. Further, while the high-speed network is referenced as an LTE network, various embodiments may be implemented for receiving data in any of a variety of high-speed networks (e.g., HSPA+, DC-HSPA, EV-DO, etc.).

Various embodiments may be implemented within a variety of communication systems, such as the example communication system 100 illustrated in FIG. 1A. The communication system 100 may include one or more wireless communication devices 102, a telephone network 104, and network servers 106 coupled to the telephone network 104 and to the Internet 108. In some embodiments, the network server 106 may be implemented as a server within the network infrastructure of the telephone network 104.

A typical telephone network 104 may include a plurality of cell base stations 110 coupled to a network operations center 112, which operates to connect voice and data calls between the wireless communication devices 102 (e.g., tablets, laptops, cellular phones, etc.) and other network destinations, such as via telephone land lines (e.g., a plain old telephone service (POTS) network, not shown) and the Internet 108. The telephone network 104 may also include one or more servers 116 coupled to or within the network operations center 112 that provide a connection to the Internet 108 and/or to the network servers 106. Communications between the wireless communication devices 102 and the telephone network 104 may be accomplished via two-way wireless communication links 114, such as GSM, UMTS, EDGE, 4G, 3G, CDMA, TD-SCDMA, TDMA, 1×RTT, LTE, and/or other communication technologies.

In general, any number of wireless networks may be deployed in a given geographic area. Each wireless network may support one or more radio access technology, which may operate on one or more frequency (also referred to as a carrier, channel, frequency channel, etc.) in the given geographic area in order to avoid interference between wireless networks of different radio access technologies.

Upon power up, the wireless communication device 102 may search for wireless networks from which the wireless communication device 102 can receive communication service. In various embodiments, the wireless communication device 102 may be configured to prefer LTE networks when available by defining a priority list in which LTE frequencies occupy the highest spots. The wireless communication device 102 may perform registration processes on one of the identified networks (referred to as the serving network), and the wireless communication device 102 may operate in a connected mode to actively communicate with the serving network. Alternatively, the wireless communication device 102 may operate in an idle mode and camp on the serving network if active communication is not required by the wireless communication device 102. In the idle mode, the wireless communication device 102 may identify all radio access technologies in which the wireless communication device 102 is able to find a "suitable" cell in a normal scenario or an "acceptable" cell in an emergency scenario, as specified in the LTE standards, such as 3GPP TS 36.304 version 8.2.0 Release 8, entitled "LTE; Evolved Universal Terrestrial Radio Access (E-UTRA); User Equipment (UE) procedures in idle mode."

The wireless communication device 102 may camp on a cell belonging to the RAT with the highest priority among all identified. The wireless communication device 102 may remain camped until either the control channel no longer satisfies a threshold signal strength or a cell of a higher priority RAT reaches the threshold signal strength. Such cell selection/reselection operations for the wireless communication device 102 in the idle mode are also described in 3GPP TS 36.304 version 8.2.0 Release 8.

Figure 1B:
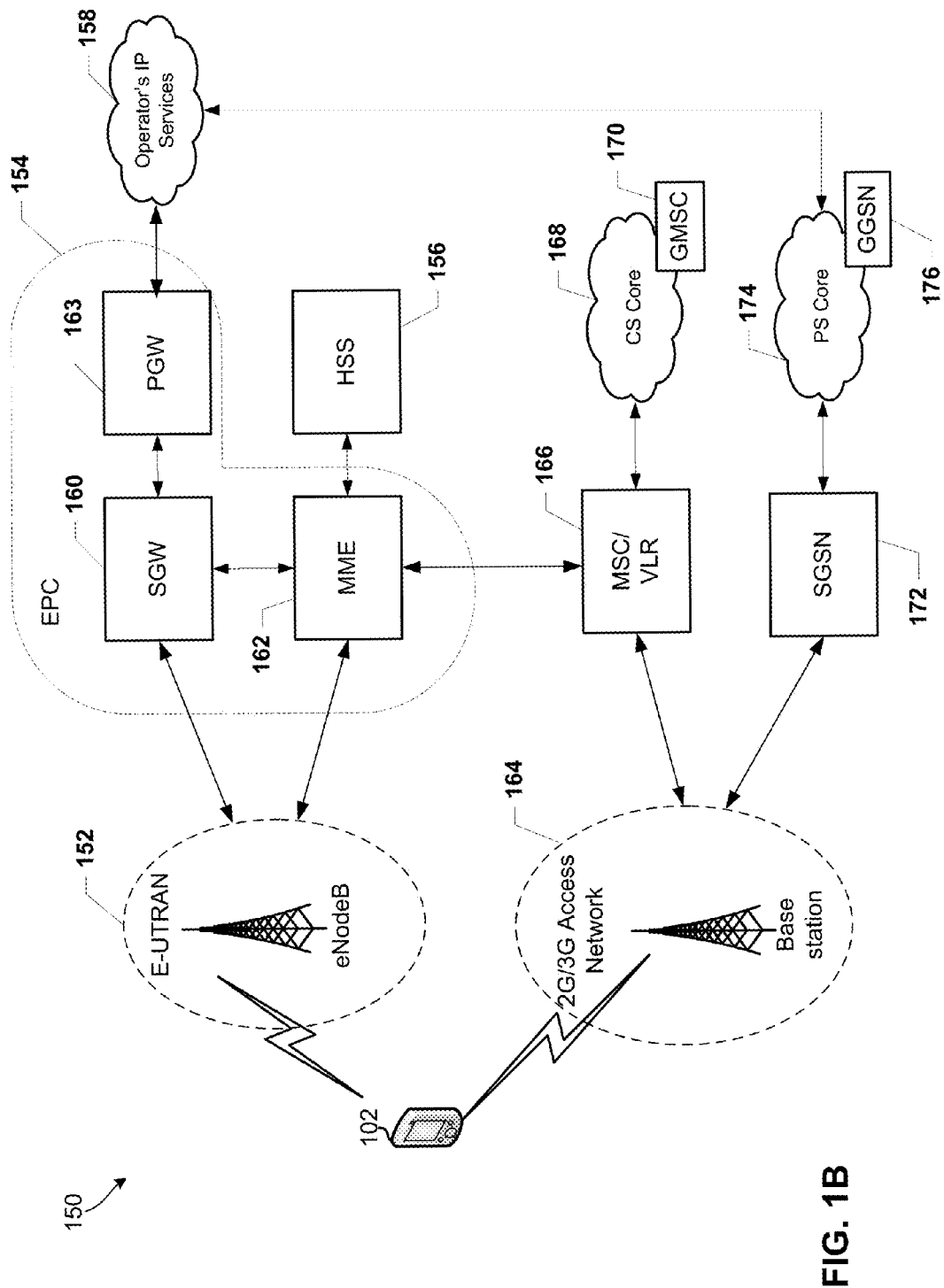
FIG. 1B is system block diagram of an Evolved Packet System (EPS) suitable for use with various embodiments.

FIG. 1B illustrates a network architecture 150 that includes an Evolved Packet System (EPS). With reference to FIGS. 1A-1B, in the network architecture 150 the wireless communication device 102 may be connected to an LTE access network, for example, an Evolved UMTS Terrestrial Radio Access Network (E-UTRAN) 152. In various embodiments, the E-UTRAN 152 may be a network of LTE base stations (i.e., eNodeBs) (e.g., 110 in FIG. 1A), which may be connected to one another via an X2 interface (e.g., backhaul) (not shown).

In various embodiments, each eNodeB may provide, to wireless communication devices, an access point to an LTE core (e.g., an Evolved Packet Core). For example, the EPS in the network architecture 150 may further include an Evolved Packet Core (EPC) 154 to which the E-UTRAN 152 may connect. In various embodiments, the EPC 154 may include at least one Mobility Management Entity (MME) 162, a Serving Gateway (SGW) 160, and a Packet Data Network (PDN) Gateway (PGW) 163.

In various embodiments, the E-UTRAN 152 may connect to the EPC 154 by connecting to the SGW 160 and to the MME 162 within the EPC 154. The MME 162, which may also be logically connected to SGW 160, may handle tracking and paging of the wireless communication device 102 and security for E-UTRAN access on the EPC 154. The MME 162 may be linked to a Home Subscriber Server (HSS) 156, which may support a database containing user subscription, profile, and authentication information. Further, the MME 162 provides bearer and connection management for user Internet protocol (IP) packets, which are transferred through the SGW 160. In various embodiments, the SGW 160 may be connected to the PGW 163, which may provide IP address allocation to the wireless communication device 102, as well as other functions. The PGW 163 may be connected to the Operator's IP Services 158, which may include, for example, the Internet, an Intranet, an IP Multimedia Subsystem (IMS), a PS Streaming Service (PSS), etc.

The network architecture 150 may also include circuit-switched (CS) and packet-switched (PS) networks. In some embodiments, the wireless communication device 102 may be connected to the CS and/or PS packet switched networks by connecting to a legacy 2G/3G access network 164, which may be one or more UTRAN, GSM EDGE Radio Access Network (GERAN), etc. In various embodiments, the 2G/3G access network 164 may include a network of base stations (e.g., base transceiver stations (BTSs), eNodeBs, radio base stations (RBSs), etc.) (e.g., 110), as well as at least one base station controller (BSC) or radio network controller (RNC). In various embodiments, the 2G/3G access network 164 may connect to the circuit switched network via an interface with (or gateway to) a Mobile switching center (MSC) and associated Visitor location register (VLR), which may be implemented together as MSC/VLR 166. In the CS network, the MSC/VLR 166 may connect to a CS core 168, which may be connected to external networks (e.g., the public switched telephone network (PSTN)) through a Gateway MSC (GMSC) 170.

In various embodiments, the 2G/3G access network 164 may connect to the PS network via an interface with (or gateway to) a Serving GPRS support node (SGSN) 172, which may connect to a PS core 174. In the PS network, the PS core 174 may be connected to external PS networks, such as the Internet and the Operator's IP services 158 through a Gateway GPRS support node (GGSN) 176.

A number of techniques may be employed by LTE network operators to enable voice calls to the wireless communication device 102 when camped on the LTE network (e.g., EPS). The LTE network (e.g., EPS) may co-exist in mixed networks with the CS and PS networks, with the MME 162 serving the wireless communication device 102 for utilizing PS data services over the LTE network, the SGSN 172 serving the wireless communication device 102 for utilizing PS data services in non-LTE areas, and the MSC/VLR 166 serving the wireless communication device 102 for utilizing voice services. In various embodiments, the wireless communication device 102 may be able to use a single RF resource for both voice and LTE data services by implementing circuit-switched fallback (CSFB) to switch between accessing the E-UTRAN 152 and the legacy 2G/3G access network 164.

The mixed network may be enabled to facilitate circuit switched fallback (CSFB) via an interface (SGs) between the MME 162 and the MSC/VLR 166. The interface enables the wireless communication device 102 to utilize a single RF resource to be both CS and PS registered while camped on the LTE network, which enables delivery CS pages via the E-UTRAN 152. A CS page may initiate the CSFB procedure, which may cause the wireless communication device 102 to transition to the CS network and utilize the CS call setup procedures.

In various embodiments, modulation and multiple access schemes may be employed by a high speed access network (e.g., E-UTRAN 152), and may vary depending on the particular telecommunications standard being deployed. For example, in LTE applications, orthogonal frequency-division multiplexing (OFDM) may be used on the downlink, while single-carrier frequency-division multiple access (SC-FDMA) may be used on the uplink to support both frequency division duplexing (FDD) and time division duplexing (TDD). Those of ordinary skill in the art will appreciate that while various embodiments may be described herein with respect to LTE, such embodiments but may be extended to other telecommunication standards employing other modulation and multiple access techniques. By way of example, various embodiments may be extended to Evolution-Data Optimized (EV-DO) and/or Ultra Mobile Broadband (UMB), each of which are air interface standards promulgated by the 3rd Generation Partnership Project 2 (3GPP2) as part of the CDMA2000 family to provide broadband Internet access to wireless communication devices. Various embodiments may also be extended to Universal Terrestrial Radio Access (UTRA) employing Wideband-CDMA (W-CDMA), GSM, Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, and/or Flash-OFDM employing OFDMA. The actual wireless communication standard and the multiple access technology employed depend on the specific application and the overall design constraints imposed on the system.

In some embodiments, access network entities (e.g., eNodeBs) may have multiple antennas supporting MIMO technology, thereby enabling the eNodeBs to exploit the spatial domain to support spatial multiplexing, beamforming, and/or transmit diversity. Spatial multiplexing may be used to transmit different streams of data simultaneously on the same frequency. In some instances, the data steams may be transmitted to a single wireless communication device to increase the data rate, while in other instances the data streams may be transmitted to multiple wireless communication devices to increase the overall system capacity. Specifically, an eNodeB may spatially precode each data stream, and transmit each spatially precoded data stream through multiple transmit antennas on the downlink. The spatially precoded data streams may arrive at the one or more wireless communication device with different spatial signatures, enabling recovery of the one or more data streams destined for that device or antenna. On the uplink, each wireless communication device may transmit a spatially precoded data stream, which enables the eNodeB to identify the source of each received data stream. In some embodiments, when channel conditions are unfavorable, beamforming may be used by the eNodeB to focus transmission energy in one or more direction. In various embodiments, beamforming may involve spatially precoding the data for transmission through multiple antennas. In some embodiments, to achieve good coverage at the edges of the cell, a single stream beamforming transmission may be used in combination with transmit diversity (e.g., sending the stream to the same source through multiple antennas).

Various embodiments may be implemented in LTE-Advanced wireless networks that have been deployed or that may be deployed in the future. LTE-Advanced communications typically use spectrum in up to 20 MHz bandwidths allocated in a carrier aggregation of up to a total of 100 MHz (5 component carriers) used for transmission in each direction. Such LTE-Advanced systems may utilize one or more of two types of carrier aggregation, non-continuous and continuous. Non-continuous carrier aggregation involves aggregating available component carriers (inter- or intra-band) that are separated in the frequency spectrum, while continuous carrier aggregation involves multiple available component carriers that are adjacent to each other. Both non-continuous and continuous carrier aggregation may aggregate multiple LTE/component carriers to serve a wireless communication device using the LTE-Advanced protocol.

Figure 2:
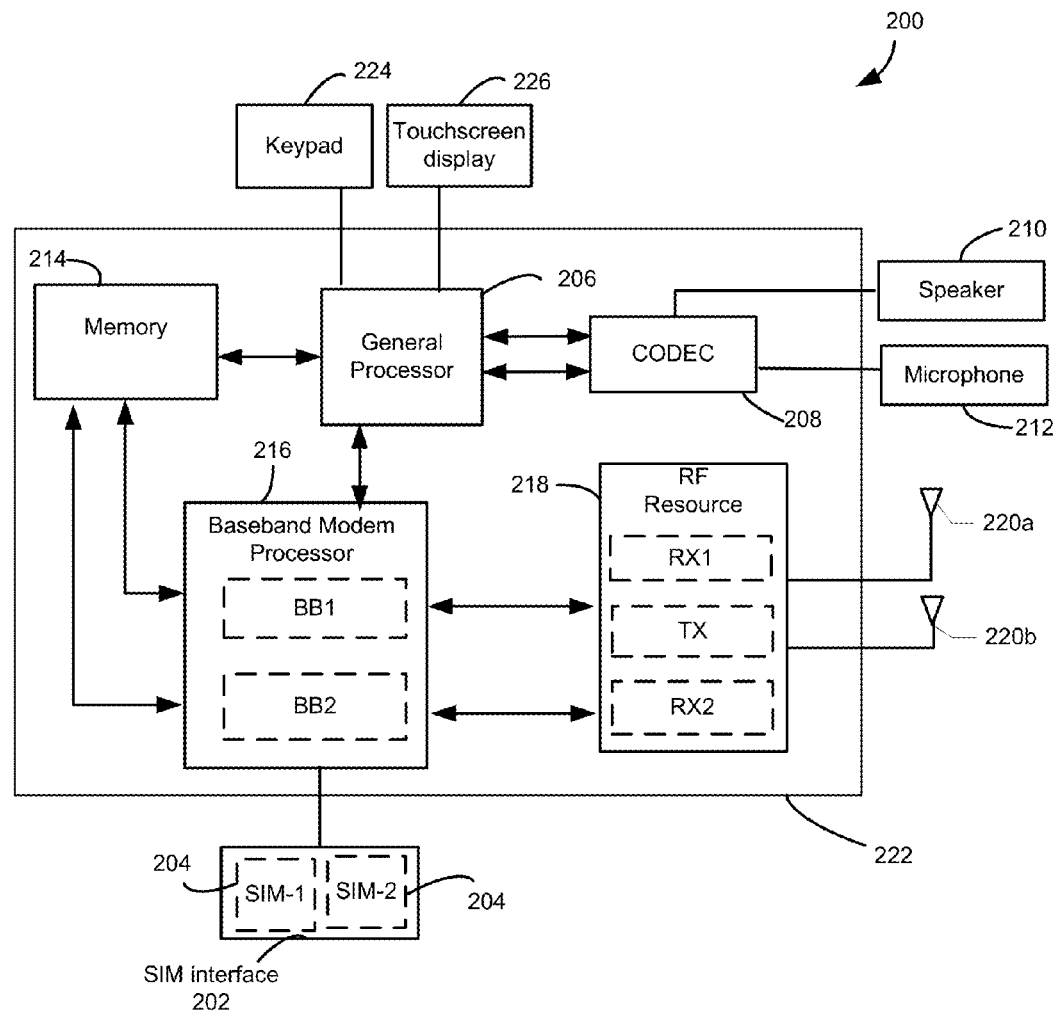
FIG. 2 is a block diagram illustrating a wireless communication device according to various embodiments.

FIG. 2 is a functional block diagram of an example multi-SIM communication device 200 that is suitable for implementing various embodiments. With reference to FIGS. 1A-2, the multi-SIM communication device 200 may be similar to one or more of the wireless communication devices 102. The multi-SIM communication device 200 may include a SIM interface 202, which may represent either one or two SIM interfaces. The SIM interface 202 may receive a first identity module SIM 204 that is associated with the first subscription. In some embodiments, the multi-SIM communication device 200 may also include a second SIM interface as part of the SIM interface 202, which may receive a second identity module SIM 204 that is associated with a second subscription.

A SIM in various embodiments may be a Universal Integrated Circuit Card (UICC) that is configured with SIM and/or USIM applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 204 may have a central processing unit (CPU), read only memory (ROM), random access memory (RAM), electrically erasable programmable read only memory (EEPROM) and input/output (I/O) circuits. A SIM 204 used in various embodiments may contain user account information, an IMSI a set of SIM application toolkit (SAT) commands and storage space for phone book contacts. A SIM 204 may further store home identifiers (e.g., a System Identification Number (SID)/Network Identification Number (NID) pair, a Home Public Land Mobile Number (HPLMN) code, etc.) to indicate the SIM network operator provider. An Integrated Circuit Card Identity (ICCID) SIM serial number may be printed on the SIM card for identification.

The multi-SIM communication device 200 may include at least one controller, such as a general purpose processor 206, which may be coupled to a coder/decoder (CODEC) 208. The CODEC 208 may in turn be coupled to a speaker 210 and a microphone 212. The general purpose processor 206 may also be coupled to at least one memory 214. The memory 214 may be a non-transitory tangible computer readable storage medium that stores processor-executable instructions. For example, the instructions may include routing communication data relating to the first or second subscription though a corresponding baseband-RF resource chain. The memory 214 may store operating system (OS), as well as user application software and executable instructions. The memory 214 may also store quality metrics for various channels supported by the SIMs 204 and the RF resource 218.

The general purpose processor 206 and memory 214 may each be coupled to at least one baseband-modem processor 216. Each SIM 204 in the multi-SIM communication device 200 may be associated with a baseband-RF resource chain that includes a baseband-modem processor 216 and at least one receive block (e.g., RX1, RX2) of an RF resource 218. In various embodiments, baseband-RF resource chains may include physically or logically separate baseband modem processors (e.g., BB1, BB2).

The RF resource 218 may be coupled to antennas 220a, 220b, and may perform transmit/receive functions for the wireless services associated with each SIM 204 of the multi-SIM communication device 200. In some embodiments, the RF resource 218 may be coupled to wireless antennas 220a, 220b for sending and receiving RF signals for multiple SIMs 204 thereby enabling the multi-SIM communication device 200 to perform simultaneous communications with separate networks and/or service associated with the SIM(s) 204. The RF resource 218 may include separate receive and transmit functionalities, or may include a transceiver that combines transmitter and receiver functions. In various embodiments, the transmit functionalities of the RF resource 218 may be implemented by at least one transmit block (TX), which may represent circuitry associated with one or more radio access technologies/SIMs In particular embodiments, the general purpose processor 206, memory 214, baseband-modem processor(s) 216, and RF resource 218 may be included in a system-on-chip device 222. The one or more SIM 204 and corresponding interface(s) 202 may be external to the system-on-chip device 222. Further, various input and output devices may be coupled to components of the system-on-chip device 222, such as interfaces or controllers. Example user input components suitable for use in the multi-SIM communication device 200 may include, but are not limited to, a keypad 224 and a touch screen display 226.

In some embodiments, the keypad 224, touch screen display 226, microphone 212, or a combination thereof, may perform the function of receiving the request to initiate an outgoing call. For example, the touch screen display 226 may receive a selection of a contact from a contact list or receive a telephone number. In another example, either or both of the touch screen display 226 and microphone 212 may perform the function of receiving a request to initiate an outgoing call. For example, the touch screen display 226 may receive selection of a contact from a contact list or receive a telephone number. As another example, the request to initiate the outgoing call may be in the form of a voice command received via the microphone 212. Interfaces may be provided between the various software modules and functions in the multi-SIM communication device 200 to enable communication between them, as is known in the art.

The baseband-modem processor of a wireless communication device may be configured to execute software including at least one protocol stack associated with at least one SIM. SIMs and associated protocol stacks may be configured to support a variety of communication services that fulfill different user requirements. Further, a particular SIM may be provisioned with information to execute different signaling procedures for accessing a domain of the core network associated with these services and for handling data thereof.

In various embodiments, the RF resource 218 may be configured with receiver and transmitter circuitry to support multiple radio access technologies/wireless networks that operate according to different wireless communication protocols. Such circuitry may allow the RF resource 218 to process signals associated with different communication standards, and may include or provide connections to different sets of amplifiers, digital to analog converters, analog to digital converters, filters, voltage controlled oscillators (VCOs), etc. In some embodiments, a first receive block (RX1) and a transmit block (TX) may operate as a pair for transmission and reception of RF signals via a first antenna in accordance with a high-speed data network, such as an LTE network. That is, various embodiments may include a first receive chain and a transmit chain that are each configured to primarily communicate with the LTE network. Further, a second receive block (RX2) may be coupled to a second antenna (i.e., forming a second receive chain), and may be configured to operate in cooperation with the transmit block and first receive block to provide dual receive capability (e.g., as used in MIMO reception). In various embodiments, the first and second receive blocks may be configured to utilize the same or different of various radio receiver elements. For example, for MIMO communications, the first and second receive blocks may respectively use the first and second antennas to tune to and receive signals on the same LTE carrier frequency using a single VCO.

In some embodiments, the first and second receive blocks may respectively use the first and second antennas to tune to and receive signals on different carrier frequencies using separate VCOs. In some embodiments, a different carrier frequency may be an LTE carrier frequency in the same or in a different band, thereby providing support for an LTE wireless network that uses carrier aggregation to combine information transmitted on two or more carrier frequencies. In some embodiments in which two different carrier frequencies are received in a carrier aggregation mode, the first and second antennas may each be shared between the first and second receive blocks. In this manner, each antenna may be able to support two receive chains (i.e., one for each carrier frequency), thereby supporting antenna diversity on both carrier frequencies.

In other embodiments, the different carrier frequency may be a channel in another RAT (e.g., using a CDMA 2000 1×, UMTS, TD-SCDMA, 1×RTT, GSM). In this manner, the additional receiver may achieve a downlink connection for a legacy network simultaneous to maintaining uplink and downlink communications on the LTE network. However, with only one receive chain allocated for LTE communication, MIMO communications is disabled for downlink communications on the LTE network. As a result, the wireless communication device may provide a rank indicator (RI) value in a channel status report or may provide another signaling control message to the LTE wireless network indicating an inability to decode higher MCS downlink data.

Figure 3:
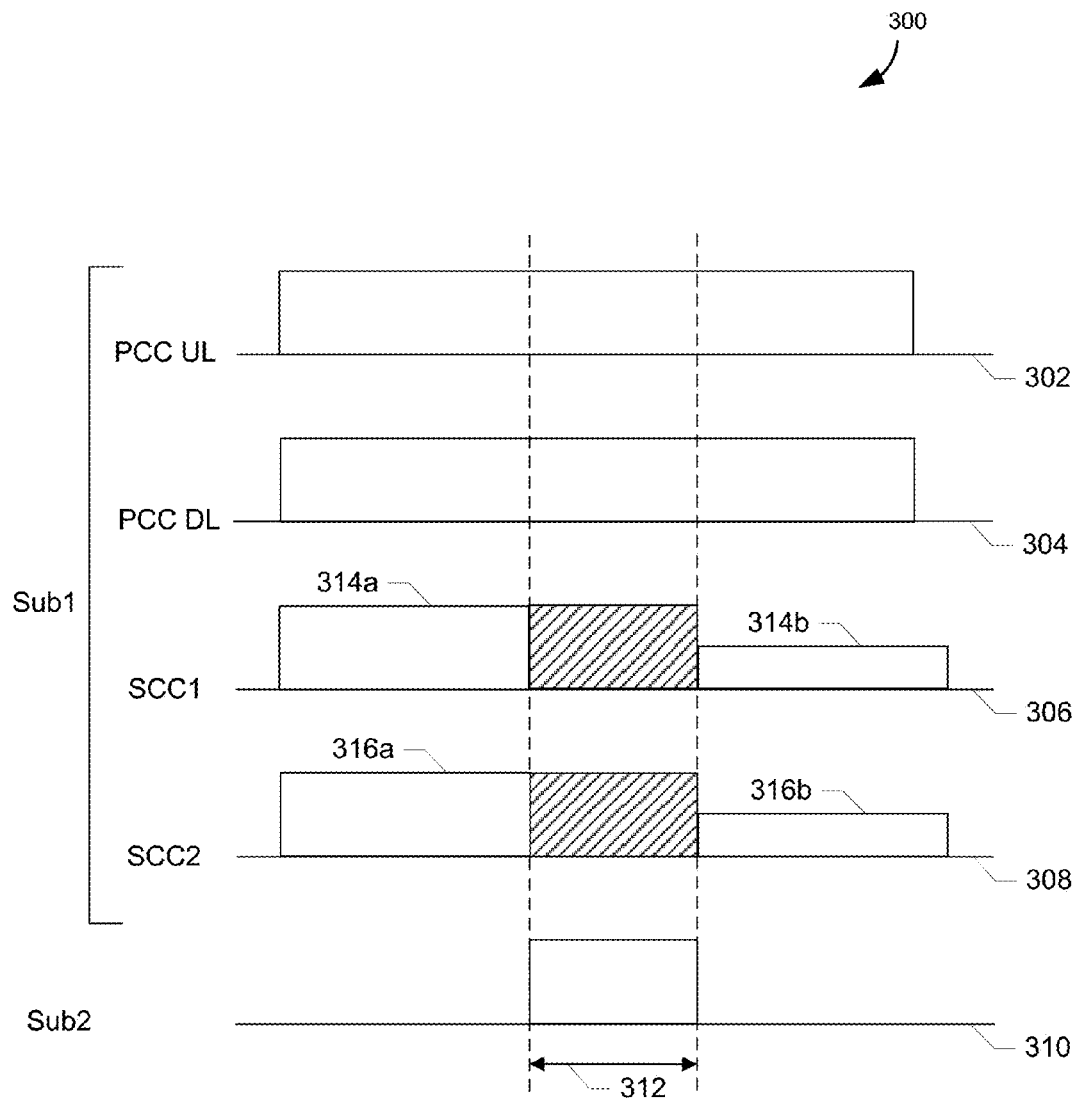
FIG. 3 is a timing diagram illustrating a conventional tune-away on a multi-SIM communication device.

In a multi-SIM communication device with one shared RF resource, tune-aways from an active subscription to an idle subscription occur in order for the idle subscription to conduct idle mode operations. FIG. 3 includes a timing diagram 300 that illustrates a tune-away in a wireless communication device with one RF resource supporting two RATs/subscriptions. The first subscription may be part of an advanced communication network that supports carrier aggregation and MIMO communications. For example, the first subscription may be a LTE CAT6 subscription with a primary component carrier (PCC) uplink channel (PCC UL 302), a PCC downlink channel (PCC DL 304), and two secondary component carriers (SCC) (SCC1 306 and SCC2 308). The SCCs 306 and 308 may support one or more receive channels, or downlink channels, in a MIMO configuration. The second subscription 310 may be a legacy subscription such as GSM, 1×RTT, or TD-SCDMA.

While the first subscription is active, the RF resource may periodically perform a tune-away 312 from the first subscription to the second subscription 310 so that the second subscription 310 may perform idle mode operations. During the tune-away 312, the RF resource chains for the SCCs 306 and 308 may be allocated to the second subscription 310 to communicate with the network. As a result, the SCCs 306 and 308 cannot receive data during the tune-away 312. The resource chain for the PCC channels 302 and 304 may not be affected during the tune-away 312. During the tune-away 312, the wireless communication device may calculate low quality metrics for the SCCs 306 and 308 because the SCCs 306 and 308 are unable to receive data. Conventionally, the low quality metrics would be sent, or reported, to the network. When that happens, the network may respond by reducing the system resources allocated to the SCCs 306 and 308, such as reducing the resource block size for each channel and changing the MCS to increase its redundancy. As described, this may lead to decreased throughput by the SCCs 306 and 308 once the tune-away 312 is complete. For example, the SCC1 306 may have a certain data throughput 314a before the tune-away 312, and after the tune-away 312 is complete may have a reduced data throughput 314b. Likewise, the SCC2 308 may have a certain data throughput 316a before the tune-away 312, and after the tune-away 312 is complete may have a reduced data throughput 316b.

After the tune-away 312 is complete, the wireless communication device may calculate higher quality metrics for the SCCs 306 and 308 because the SCCs 306 and 308 are now able to receive data. While the wireless communication device will report the higher quality metrics of the SCCs 306 and 308 to the network, the eNodeBs of the network may take a relatively long time to assimilate the quality metrics and allocate more system resources to the SCCs 306 and 308. Thus, the reduced data throughputs 314b and 316b for the SCCs 306 and 308 may persist for a long enough time to reduce the data throughput of the first subscription. This means that the SCCs 306 and 308 may be operating at less than full capacity for some time after the tune-away 312 is complete.

Figure 4:
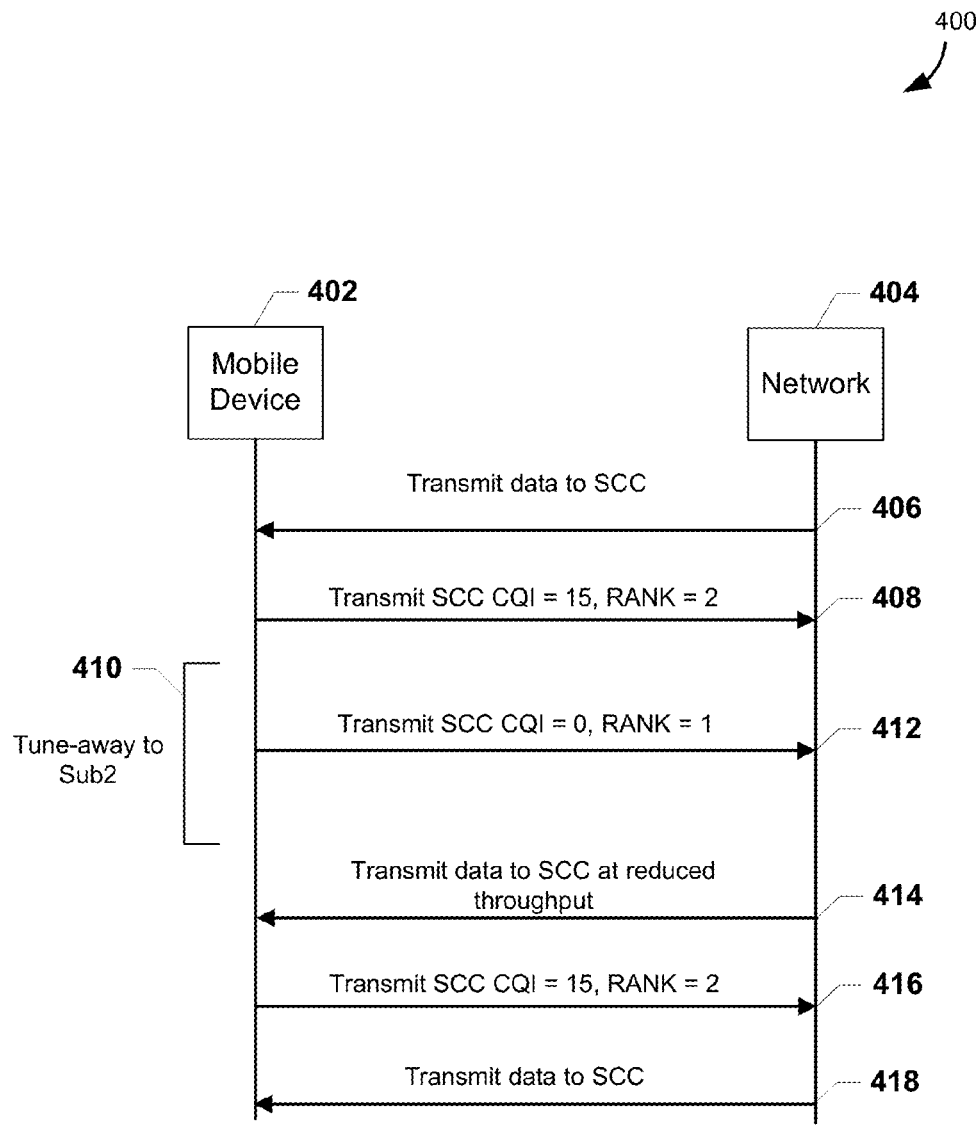
FIG. 4 is a communication flow diagram illustrating conventional reporting of quality metrics during a tune-away on a multi-SIM communication device.

FIG. 4 includes a communication flow diagram 400 illustrating communications between a wireless communication device 402 and a network 404 before, during, and after a tune-away 410. The wireless communication device 402 may have one RF resource supporting two RATs/subscriptions, and the first subscription may be part of an advanced communication network that supports carrier aggregation and MIMO communications. For example, the first subscription may be a LTE CAT6 subscription with a PCC and one or more carriers configured for downlink reception of data from the network 404 (e.g., SCCs). The second subscription may be a legacy subscription such as GSM, 1×RTT, or TD-SCDMA.

In the example illustrated in FIG. 4, the network 404 transmits data to the one or more carriers of the first subscription in transmission 406. For a plurality of carriers, the transmission 406 may be in the form of a MIMO communication in which multiple antennas of the RF resource on the wireless communication device 402 allows each carrier to receive a separate receive chain. The wireless communication device 402 may periodically or aperiodically report quality metrics of each carrier to the network 404 in transmissions 408. For example, if a carrier has a high communications quality and is capable of 2×2 MIMO communications, the wireless communication device 402 may report a CQI of 15 and a RI of 2 for the carrier. Periodically a tune-away 410 may occur from the first subscription to the second subscription to support the idle monitoring functions of the second subscription. Performing the tune-away 410 prevents one or more carriers of the first subscription from receiving data from the network 404. Consequently, the quality metrics of the carriers as calculated by the wireless communication device 402 will be reduced. In the example illustrated in FIG. 4, the wireless communication device 402 transmits the reduced quality metrics for each carrier in transmission 412. For example, during the tune-away 410, the wireless communication device 402 may report a CQI of 0 and a RI of 1 for each carrier.

In response to receiving the reduced quality metrics, the network 404 may reduce the system resources allocated to the one or more carriers of the wireless communication device 402. This may include reducing the resource block size assigned to each carrier and changing the MCS to increase its redundancy. After the tune-away 410 is complete, the one or more carriers of the wireless communication device 402 may resume reception of data from the network 404 in transmissions 414. However, because the network 404 reduced the system resources of the carriers, the throughput of data being received by each carrier will initially be lower. In addition, because the carriers were not capable of supporting MIMO communications during the tune-away 410, the network 404 may not attempt MIMO communications after the tune-away 410 is complete even though the carriers may be capable of MIMO communications.

After the tune-away 410 is complete, the wireless communication device 402 may again calculate the quality metrics for each carrier, which may result in improved quality metrics as compared to during the tune-away 410. For example, a carrier may once again exhibit a CQI of 15 and a RI of 2. The wireless communication device 402 may transmit the higher quality metrics to the network 404 in transmission 416, and the network 404 may respond by allocating more system resources to each carrier, such as by increasing the resource block size or changing the MCS to reduce the amount of redundancy. The network 404 may transmit data at a higher throughput to the wireless communication device 402 in transmissions 418. However, in the time between the end of the tune-away 410 and the transmissions 418, the carriers of the wireless communication device 402 may be operating at less than full capacity because of reduced system resources allocated to the carriers by the network 404.

Figure 5:
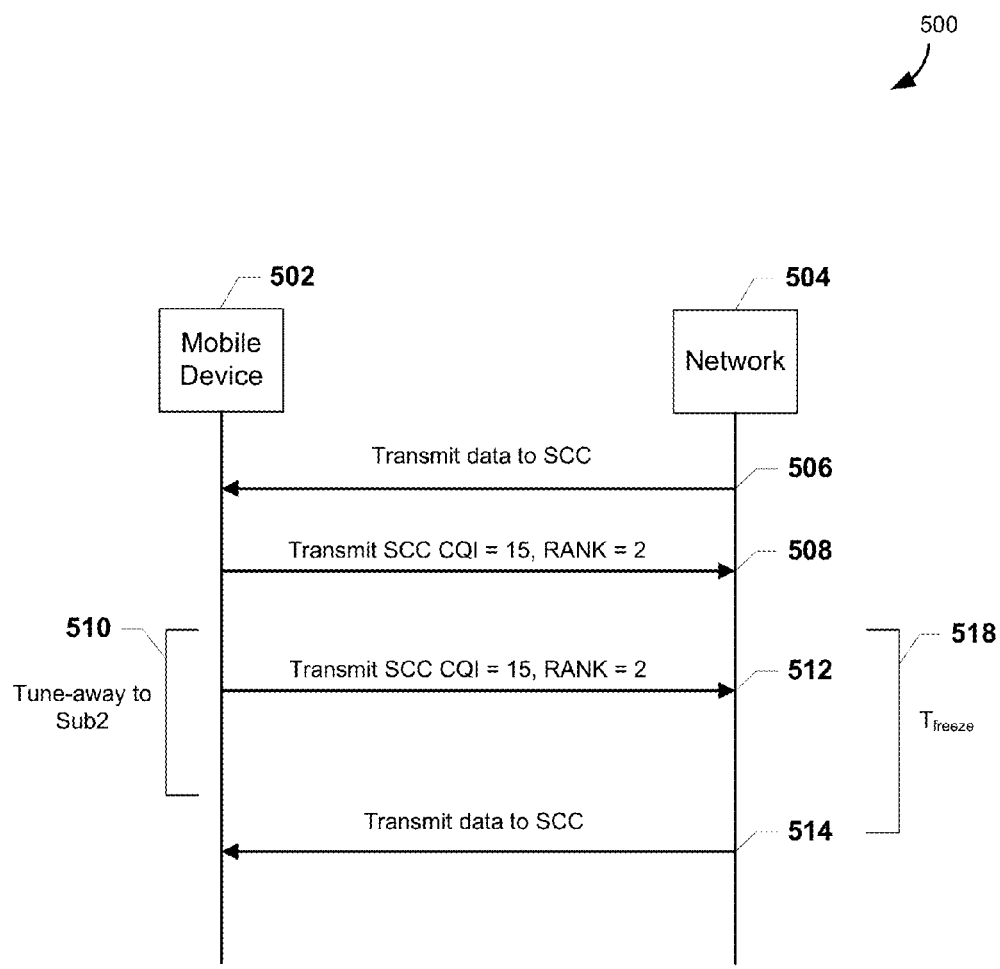
FIGS. 5-6 are communication flow diagrams illustrating reporting of quality metrics during a tune-away on a multi-SIM communication device according to various embodiments.

Various embodiments mitigate this impact on data communication rates by storing (or "freezing") the quality metrics of each carrier before a tune-away begins and reporting the "frozen quality metrics" or "stored quality metrics" to the network during the tune-away. FIG. 5 is a communication flow diagram 500 illustrating communications between a wireless communication device 502 and a network 504 before, during, and after a tune-away 510 including the reporting of frozen quality metrics to the network 504 during a tune-away according to various embodiments.

With reference to FIGS. 1-2 and 5, the wireless communication device 502 (which may be similar to the wireless communication device 102, 200) may have one RF resource supporting two RATs/subscriptions, with the first subscription part of an advanced communication network that supports carrier aggregation and MIMO communications, while the second subscription may be with a legacy technology network. For example, the first subscription may be a LTE CAT6 subscription with a PCC and one or more carriers configured for downlink reception of data from the network 504 (e.g., SCCs), and the second subscription may be GSM, 1×RTT, or TD-SCDMA.

In the example illustrated in flow diagram 500, the network 504 transmits data to one or more carriers of the first subscription in transmission 506. For a plurality of carriers, the transmission 506 may be in the form of a MIMO communication in which multiple antennas of the RF resource on wireless communication device 502 allows each carrier to receive a separate downlink channel. The wireless communication device 502 may periodically or aperiodically report quality metrics of each carrier to the network 504 in transmissions 508. For example, if a carrier has a high communications quality and is capable of 2×2 MIMO communications, the wireless communication device 502 may report a CQI of 15 and a RI of 2 for the carrier.

The wireless communication device 502 may store the calculated quality metrics of each carrier before a tune-away 510 is scheduled in operation 509. These stored quality metrics, referred to as "frozen quality metrics," may be calculated as average values for a period of time before the tune-away 510 begins, or may be instantaneous values measured at a time instant shortly before the tune-away 510 begins. The frozen quality metrics may be stored in memory on the wireless communication device 502, such as the memory 214.

Periodically, a tune-away 510 occurs from the first subscription to the second subscription, which prevents the one or more carriers of the first subscription from receiving data from the network 504. The inability to receive data from one or more carriers of the first subscription would normally result in the calculation of lower quality metrics by the wireless communication device 502 for each carrier during the tune-away 510. However, instead of calculating the actual quality metrics of each carrier, the wireless communication device 502 transmits the frozen quality metrics to the network 504 at transmission 512. For example, if the quality metrics of a carrier included a CQI of 15 and a RI of 2 before the tune-away 510 began and these quality metrics were stored as frozen quality metrics, the wireless communication device 502 may continue to report a CQI of 15 and a RI of 2 for the carrier during the tune-away 510.

Reporting the same or similar quality metrics for a carrier before and during the tune-away 510 may cause the network 504 to not change any system resources allocated to each carrier. From the perspective of the network 504, nothing has happened on the wireless communication device 502 (e.g., the tune-away 510) that would indicate the need to change the reception quality of the carriers of the first subscription. Thus, the network 504 may continue to transmit data to each carrier with the same throughput as before the tune-away 510. Once the tune-away 510 is complete, the one or more carriers of the first subscription may begin receiving and processing the data transmitted by the network 504 during the tune-away 510, as well as newly transmitted data in transmission 514. Thus, the data throughput of the carriers of the first subscription at the transmission 506 (before the tune-away 510) and the transmission 514 (after the tune-away 510) may be the same or similar.

A time threshold "$T_{freeze}$" 518 may be used to determine the length of time that the wireless communication device 502 may report the frozen quality metrics to the network 504. The time threshold 518 may be used to prevent overloading of the carriers in case a tune-away lasts for a long time. In some embodiments, the time threshold 518 may be calculated based on the average tune-away time of the wireless communication device 502, and may be on the order of milliseconds. The average tune-away time may be calculated from the durations of the previous M tune-aways, or from the durations of tune-aways occurring in the previous N amount of time, or some other method. If the duration of the tune-away 510 is shorter than the time threshold 518 (as illustrated in FIG. 5), the wireless communication device 502 may continue to report the frozen quality metrics for the entire duration of the tune-away 510. Otherwise, if the duration of the tune-away 510 is longer than (or equal to) the threshold the wireless communication device 502 may begin sending the actual quality metrics to the network 504 as described in further detail with reference to FIG. 6.

Figure 6:
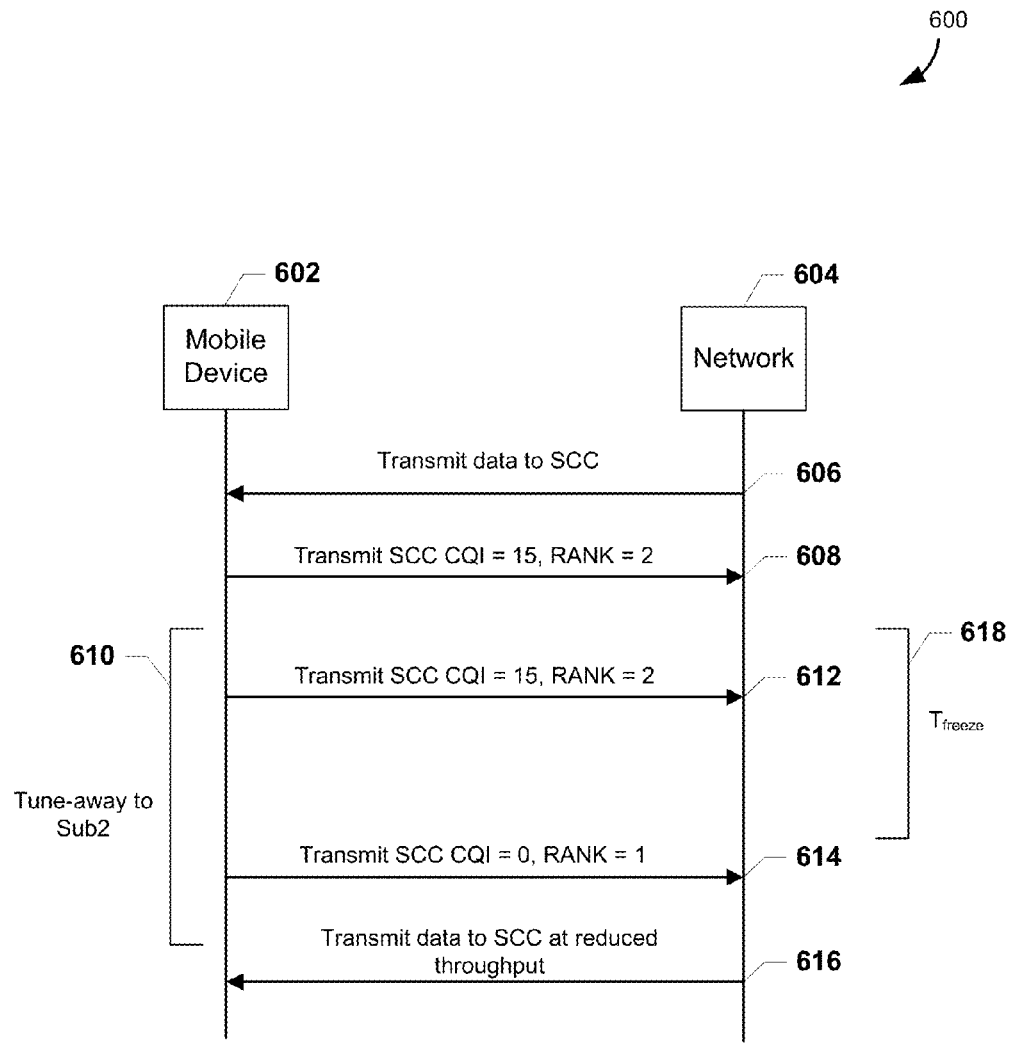

FIG. 6 is a communication flow diagram 600 illustrating quality metrics reporting when the duration of the tune-away exceeds the time threshold according to various embodiments. With reference to FIGS. 1-2, 5, and 6, the communication flow diagram 600 illustrates communications between a wireless communication device 602 (which may be similar to the wireless communication device 102, 200, 502) and a network 604 before, during, and after a tune-away 610. In the flow diagram 600, the wireless communication device 602 may have one RF resource supporting two RATs/subscriptions, with the first subscription part of an advanced communication network that supports carrier aggregation and MIMO communications, and the second subscription being of a legacy technology. For example, the first subscription may be a LTE CAT6 subscription with a PCC, and one or more carriers configured for downlink reception of data from the network 604 (e.g., SCCs), and the second subscription may be GSM, 1×RTT, or TD-SCDMA.

The network 604 transmits data to the one or more carriers of the first subscription in transmissions 606. For a plurality of carriers, the transmissions 606 may be in the form of a MIMO communications in which multiple antennas of the RF resource on wireless communication device 602 enable each carrier to receive a separate downlink channel. The wireless communication device 602 may periodically or aperiodically report quality metrics of each carrier to the network 604 in transmissions 608. For example, if a carrier has a high communications quality and is capable of 2×2 MIMO communications, the wireless communication device 602 may report a CQI of 15 and a RI of 2 for the carrier. The wireless communication device 602 may store the calculated quality metrics of each carrier as "frozen quality metrics" at a time before a tune-away 610 is scheduled in operation 609. Again, the frozen quality metrics may be calculated as average values for a period of time before the tune-away 610 begins, or may be instantaneous values at a time instant before the tune-away 610 begins. The average tune-away time may be calculated from the durations of the previous M tune-aways, or from the durations of tune-aways occurring in the previous N amount of time, or some other method. The frozen quality metrics may be stored in a memory (e.g., 214) on the wireless communication device 602.

Periodically, the wireless communication device 602 may perform the tune-away 610 from the first subscription to the second subscription, during which one or more carriers of the first subscription may not receive data from the network 604. During the tune-away 610, instead of calculating the actual quality metrics of each carrier, the wireless communication device 602 transmits the frozen quality metrics to the network 604 in transmission(s) 612. For example, if the quality metrics of a carrier included a CQI of 15 and a RI of 2 before the tune-away 610 began and these quality metrics were stored as frozen quality metrics, the wireless communication device 602 would continue to report a CQI of 15 and a RI of 2 for the carrier during the tune-away 610.

As long as the duration of the tune-away 610 is shorter than a time threshold 618, the wireless communication device 602 may continue reporting the frozen quality metrics in the transmission(s) 612. Once the duration of the tune-away 610 equals or exceeds the time threshold 618, the wireless communication device 602 may calculate and report actual quality metrics of each carrier in transmission 614. For example, during the period of the tune-away 610 that equals or exceeds the time threshold 618, the wireless communication device 602 may report a CQI of 0 and a RI of 1 for each carrier in transmission 614. In response to receiving the reduced quality metrics in the transmission 614, the network 604 may reduce the system resources allocated to the one or more carriers of the first subscription. This may include reducing the resource block size and changing the MCS to increase its redundancy.

After the tune-away 610 is complete, the one or more carriers of the first subscription may resume reception of data from the network 604 at transmission 616. The throughput of data being received by each carrier may increase in response to the wireless communication device 602 sending new, higher quality metrics for the carriers to the network 604 and the network 604 readjusts the allocated system resources to the carriers.

Figure 7:
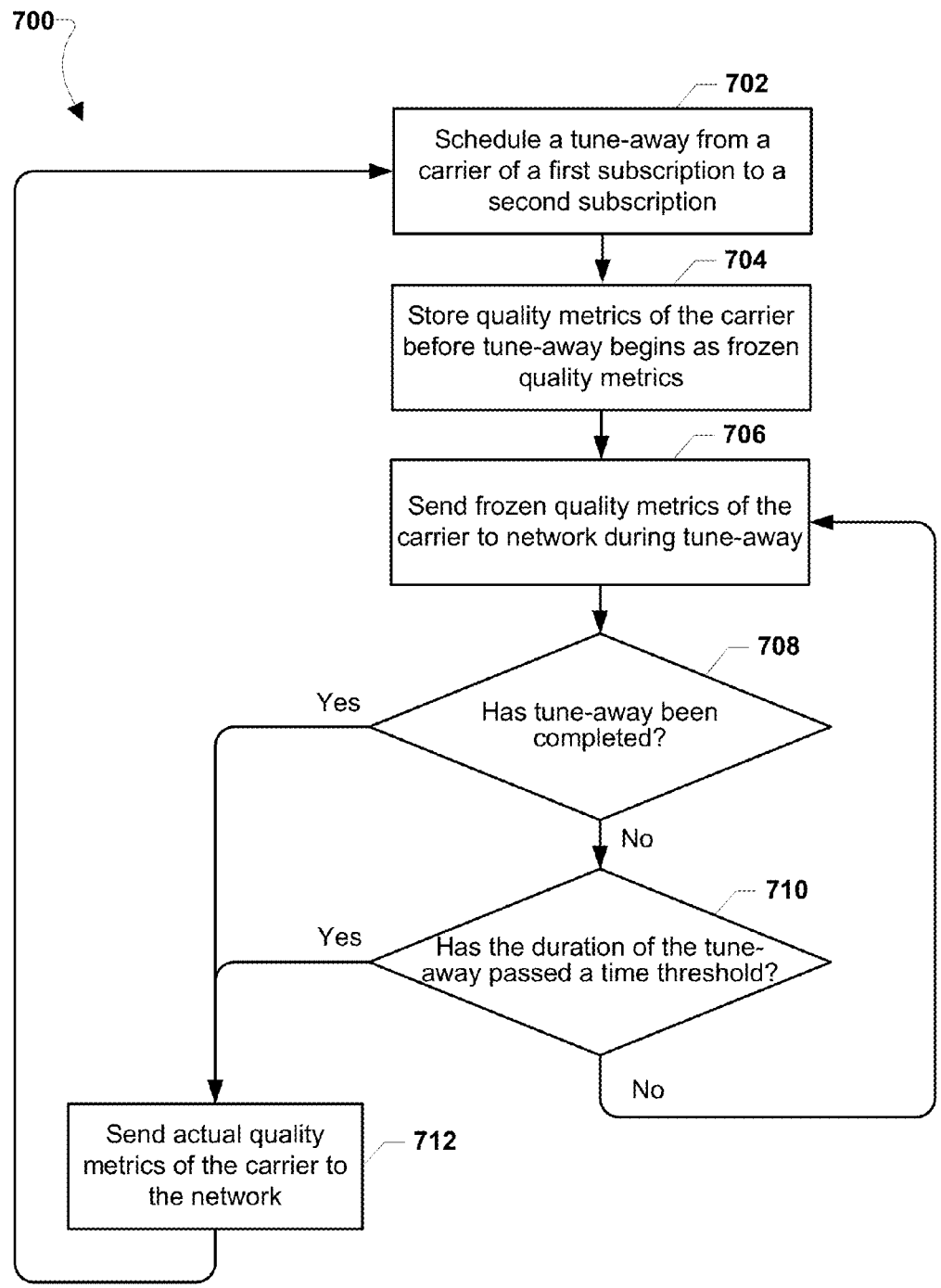
FIG. 7 is a process flow diagram illustrating a method for reporting quality metrics in a wireless communication device to a network according to various embodiments.

FIG. 7 illustrates a method 700 for reporting quality metrics on a wireless communication device according to various embodiments. With reference to FIGS. 1-2, and 5-7, the operations of the method 700 may be implemented by one or more processors of the multi-SIM communication device 200, such as a general purpose processor 206, a baseband modem processor(s) 216, or a separate controller (not shown) that may be coupled to the memory 214 and to the baseband modem processor(s) 216.

In block 702, the wireless communication device processor may schedule a tune-away from one or more carriers of a first subscription to a second subscription. The wireless communication device may have one RF resource that is shared by multiple SIMs/subscriptions. The first subscription, which includes the one or more carriers, may be part of an advanced communications network, such as LTE. The first subscription may support carrier aggregation and MIMO communication. For example, the first subscription may have a PCC with downlink and uplink carrier channels, and one or more SCCs acting as downlink channels. The tune-away may be from the secondary cells of the one or more SCCs to the frequency supporting the second subscription. The second subscription may be a legacy communications network, such as GSM, 1×RTT, or TD-SCDMA. The method 700 may be applicable to each SCC supported by the first subscription.

In block 703, the device processor may determine quality metrics of the one or more carriers before the tune-away begins. The quality metrics may include a CQI and/or a RI of the one or more carriers, or other indications of the carrier communication quality and ability of the one or more carriers to support MIMO communication. The frozen quality metrics may be calculated as average values for a period of time before the tune-away begins, or may be instantaneous values at a time instant before the tune-away begins. In block 704, before the tune-away begins, the device processor may store the determined quality metrics (frozen quality metrics) of the one or more carriers in memory on the device (e.g. the memory 214).

In block 705, the device processor may tune-away from the one or more carriers of the first subscription to the second subscription. In block 706, the device processor may send, or otherwise report, the frozen quality metrics of the one or more carriers to the network during the tune-away. The wireless communication device may send the frozen quality metrics instead of the actual quality metrics (which would indicate low channel quality) in order to prevent the network from reducing the system resources allocated to the one or more carrier channels. For example, in response to the frozen quality metrics, the network may keep the resource block size constant and not change the MCS for the one or more carriers because from the perspective of the network the quality of the one or more carriers has not changed.

In determination block 708, the device processor may determine whether the tune-away has been completed. In response to determining that the tune-away has been completed (i.e., determination block 708="Yes"), the device processor may calculate and send the actual quality metrics of the one or more carriers to the network, in block 712. That is, if the tune-away is complete the wireless communication device stops sending the frozen quality metrics to the network and instead sends the actual quality metrics of the one or more carriers. The actual quality metrics may be the quality metrics of the one or more carriers as calculated after the tune-away is complete.

In response to determining that the tune-away has not been completed (i.e., determination block 708="No"), the device processor may determine whether the duration of the tune-away has exceeded a tune-away time threshold, in determination block 710. The tune-away time threshold may be calculated as the average tune-away time in the wireless communication device, or may be pre-defined as an amount of time beyond which carriers may not be able to recover data not received during the tune-away.

In response to determining that the duration of the tune-away has not exceeded the time threshold (i.e., determination block 710="No"), the device processor may continue to send the frozen quality metrics of the one or more carriers to the network, in block 706. In other words, as long as the tune-away is ongoing but does not exceed the time threshold, the device processor may continue to send the frozen quality metrics to the network so that the network does not reduce the system resources allocated to the one or more carriers.

In response to determining that the duration of the tune-away has exceeded the tune-away time threshold (i.e., determination block 710="Yes"), the device processor may calculate and send the actual quality metrics of the one or more carriers to the network, in block 712. The actual quality metrics may be the quality metrics of the one or more carriers as calculated during the tune-away.

The operations of the method 700 may be performed in a continuous manner by performing the operations in blocks 704 through 712 whenever a tune-away is scheduled from a carrier of the first subscription to the second subscription, in block 702.

Figure 8:
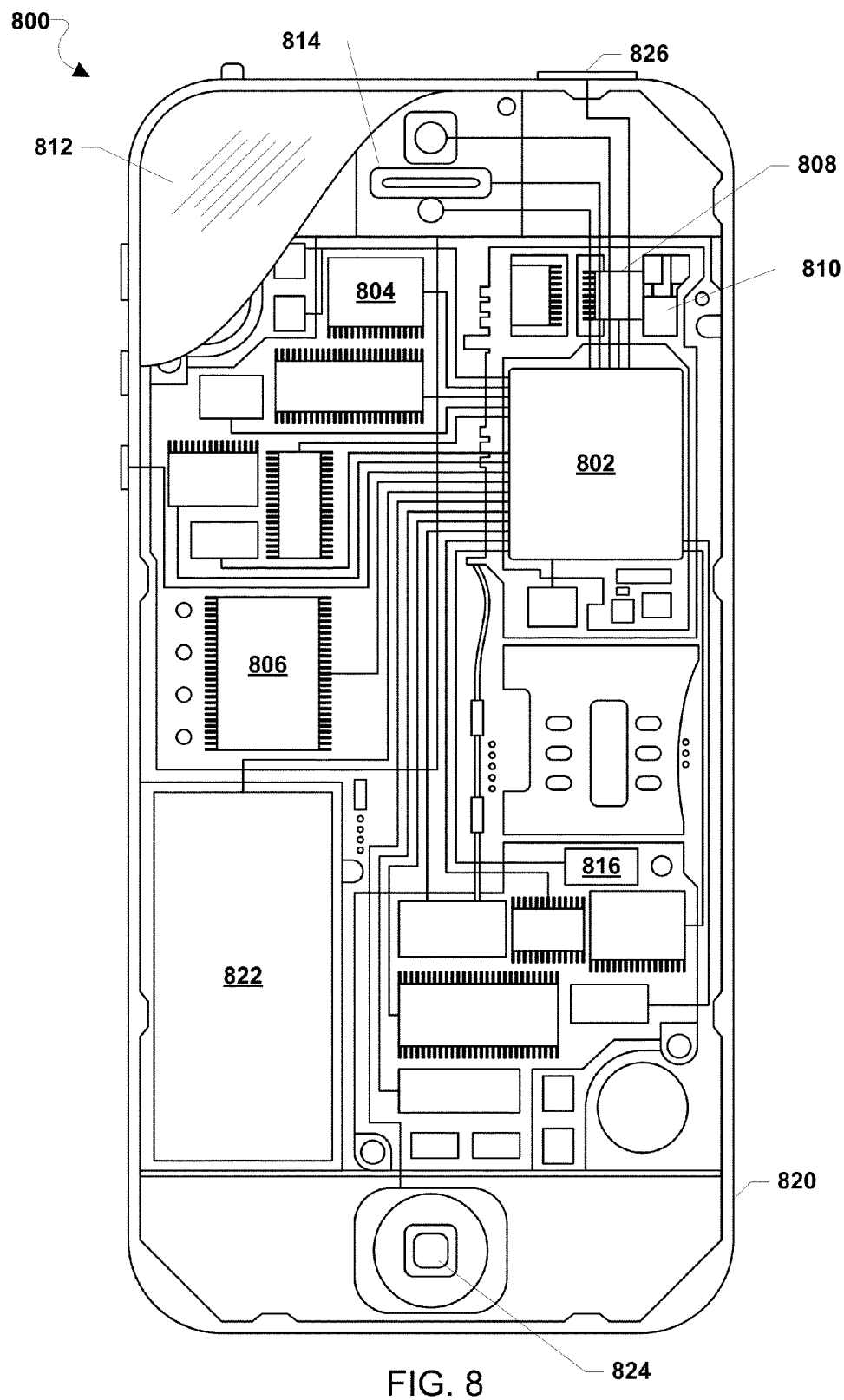
FIG. 8 is a component diagram of an example wireless communication device suitable for use with various embodiments.

Various embodiments may be implemented in any of a variety of computing devices, an example of which (e.g., wireless communication device 800) is illustrated in FIG. 8.

According to various embodiments, the wireless communication device 800 may be similar to the wireless communication devices 102 as described with reference to FIGS. 1A and 1B, as well as multi-SIM communication device 200, 502, and 602 as described with reference to FIGS. 2, 5, and 6. As such, the wireless communication device 800 may implement the method 700 in FIG. 7.

A wireless communication device 800 may include a processor 802 coupled to a touchscreen controller 804 and an internal memory 806. The processor 802 may be one or more multi-core integrated circuits designated for general or specific processing tasks. The internal memory 806 may be volatile or non-volatile memory, and may also be secure and/or encrypted memory, or unsecure and/or unencrypted memory, or any combination thereof. The touchscreen controller 804 and the processor 802 may also be coupled to a touchscreen panel 812, such as a resistive-sensing touchscreen, capacitive-sensing touchscreen, infrared sensing touchscreen, etc. Additionally, the display of the wireless communication device 800 need not have touch screen capability.

The wireless communication device 800 may have one or more cellular network transceivers 808 coupled to the processor 802 and to one or more antennas 810 and configured for sending and receiving cellular communications. The one or more transceivers 808 and the one or more antennas 810 may be used with the herein-mentioned circuitry to implement methods according to various embodiments. The wireless communication device 800 may include one or more SIM cards 816 coupled to the one or more transceivers 808 and/or the processor 802 and may be configured as described herein.

The wireless communication device 800 may also include speakers 814 for providing audio outputs. The wireless communication device 800 may also include a housing 820, constructed of a plastic, metal, or a combination of materials, for containing all or some of the components discussed herein. The wireless communication device 800 may include a power source 822 coupled to the processor 802, such as a disposable or rechargeable battery. The rechargeable battery may also be coupled to the peripheral device connection port to receive a charging current from a source external to the wireless communication device 800. The wireless communication device 800 may also include a physical button 824 for receiving user inputs. The wireless communication device 800 may also include a power button 826 for turning the wireless communication device 800 on and off.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

While the terms "first" and "second" are used herein to describe data transmission associated with a SIM and data receiving associated with a different SIM, such identifiers are merely for convenience and are not meant to limit various embodiments to a particular order, sequence, type of network or carrier.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc in which disks usually reproduce data magnetically, while discs reproduce data optically with lasers. Combinations of the storage media are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present invention is not intended to be limited to the embodiments shown herein but is to be accorded the widest scope consistent with the following claims and the principles and novel features disclosed herein.

What is claimed is:

1. A method of reporting quality metrics of a wireless communication device to a network, comprising:
   determining quality metrics of one or more carriers of a first subscription on the wireless communication device before a tune-away begins;
   storing the quality metrics on the wireless communication device;
   tuning away from the one or more carriers of the first subscription to a second subscription; and
   sending the stored quality metrics from the wireless communication device to the network during the tune-away, wherein the one or more carriers receive data from the network after the tune-away is complete at approximately a same throughput as before the tune-away began.

2. The method of claim 1, the method further comprising:
   determining whether a duration of the tune-away has exceeded a time threshold;
   continuing to send the stored quality metrics to the network during the tune-away in response to determining that the duration of the tune-away has not exceeded the time threshold; and
   sending actual quality metrics of the one or more carriers to the network during the tune-away in response to determining that the duration of the tune-away has exceeded the time threshold.

3. The method of claim 2, wherein the actual quality metrics are determined as quality metrics of the one or more carriers during the tune-away.

4. The method of claim 2, wherein the one or more carriers receive data from the network after the tune-away is complete at a reduced throughput relative to before the tune-away began.

5. The method of claim 2, wherein the time threshold is calculated as an average duration of tune-aways on the wireless communication device.

6. The method of claim 1, the method further comprising:
   determining whether the tune-away has completed; and
   sending actual quality metrics of the one or more carriers to the network in response to determining that the tune-away has completed.

7. The method of claim 6, wherein the actual quality metrics are determined as quality metrics of the one or more carriers after the tune-away is complete.

8. The method of claim 1, wherein the stored quality metrics comprises at least one of a channel quality indicator and a rank indicator.

9. The method of claim 1, wherein the one or more carriers comprise one or more secondary component carriers of a radio frequency (RF) resource of the wireless communication device that supports carrier aggregation.

10. The method of claim 1, wherein the one or more carriers are part of an LTE subscription.

11. The method of claim 1, wherein determining quality metrics of the one or more carriers of the first subscription comprises calculating average values of the quality metrics of the one or more carriers over a period of time before the tune-away begins.

12. The method of claim 1, determining quality metrics of the one or more carriers of the first subscription comprises calculating instantaneous values of the quality metrics of the one or more carriers at a time instant before the tune-away begins.

13. A wireless communication device comprising: a memory;
   a first radio frequency (RF) resource supporting a first subscription and a second subscription, wherein the first subscription comprises one or more carriers;
   a processor coupled to the first RF resource and the memory, the processor configured with processor-executable instructions to:
   determine quality metrics of the one or more carriers before a tune-away begins; store the quality metrics in the memory;
   tune away from the one or more carriers of the first subscription to the second subscription; and
   send the stored quality metrics from the wireless communication device to a network during the tune-away, wherein the one or more carriers receive data from the network after the tune-away is complete at approximately a same throughput as before the tune-away began.

14. The wireless communication device of claim 13, wherein the processor is further configured with processor-executable instructions to:
   determine whether a duration of the tune-away has exceeded a time threshold; continue to send the stored quality metrics to the network during the tune-away in response to determining that the duration of the tune-away has not exceeded the time threshold; and
   send actual quality metrics of the one or more carriers to the network during the tune-away in response to determining that the duration of the tune-away has exceeded the time threshold.

15. The wireless communication device of claim 14, wherein the actual quality metrics are determined as quality metrics of the one or more carriers during the tune-away.

16. The wireless communication device of claim 14, wherein the one or more carriers receive data from the network after the tune-away is complete at a reduced throughput relative to before the tune-away began.

17. The wireless communication device of claim 14, wherein the time threshold is calculated as an average duration of tune-aways on the wireless communication device.

18. The wireless communication device of claim 13, wherein the processor is further configured with processor-executable instructions to:
   determine whether the tune-away has completed; and
   send actual quality metrics of the one or more carriers to the network in response to determining that the tune-away has completed.

19. The wireless communication device of claim 18, wherein the actual quality metrics are determined as quality metrics of the one or more carriers after the tune-away is complete.

20. The wireless communication device of claim 13, wherein the stored quality metrics comprises at least one of a channel quality indicator and a rank indicator.

21. The wireless communication device of claim 13, wherein the one or more carriers comprise one or more secondary component carriers of the first RF resource that supports carrier aggregation.

22. The wireless communication device of claim 13, wherein the processor is further configured with processor-executable instructions to determine quality metrics of the one or more carriers by calculating average values of the quality metrics of the one or more carriers over a period of time before the tune-away begins.

23. The wireless communication device of claim 13, wherein the processor is further configured with processor-executable instructions to determine quality metrics of the one or more carriers by calculating instantaneous values of the quality metrics of the one or more carriers at a time instant before the tune-away begins.

24. The wireless communication device of claim 13, wherein the wireless communication device comprises no more than one RF resource.

25. A non-transitory processor-readable storage medium having stored thereon processor-executable instructions configured to cause a processor of a wireless communication device to perform operations comprising:
   determining quality metrics of one or more carriers of a first subscription on the wireless communication device before a tune-away begins;
   storing the quality metrics on the wireless communication device;
   tuning away from the one or more carriers of the first subscription to a second subscription; and sending the stored quality metrics from the wireless communication device to a network during the tune-away, wherein the one or more carriers receive data from the network after the tune-away is complete at approximately a same throughput as before the tune-away began.

26. The non-transitory processor-readable storage medium of claim 25, wherein the stored processor-executable instructions are further configured to cause the processor of the wireless communication device to perform operations comprising: determining whether a duration of the tune-away has exceeded a time threshold; continuing to send the stored quality metrics to the network during the tune-away in response to determining that the duration of the tune-away has not exceeded the time threshold; and sending actual quality metrics of the one or more carriers to the network during the tune-away in response to determining that the duration of the tune-away has exceeded the time threshold.

27. The non-transitory processor-readable storage medium of claim 25, wherein the stored processor-executable instructions are further configured to cause the processor of the wireless communication device to perform operations comprising:
   determining whether the tune-away has completed; and
   sending actual quality metrics of the one or more carriers to the network in response to determining that the tune-away has completed.

28. A wireless communication device comprising:
   means for determining quality metrics of one or more carriers of a first subscription on the wireless communication device before a tune-away begins;
   means for storing the quality metrics on the wireless communication device;
   means for tuning away from the one or more carriers of the first subscription to a second subscription; and
   means for sending the stored quality metrics from the wireless communication device to a network during the tune-away, wherein the one or more carriers receive data from the network after the tune-away is complete at approximately a same throughput as before the tune-away began.

* * * * *